United States Patent [19]

Van Benthem et al.

[11] Patent Number: 5,160,753
[45] Date of Patent: Nov. 3, 1992

[54] METHOD OF PREPARING AN AQUEOUS FOOD SUPPLEMENT FOR CATTLE AND THUS PREPARED FOOD SUPPLEMENT

[75] Inventors: Jan Van Benthem, Yde; Koos Van Etten, Dordrecht, both of Netherlands

[73] Assignee: Van Epenhuysen Chemische Fabrieken b.v., Zwijndrecht, Netherlands

[21] Appl. No.: 849,818

[22] Filed: Mar. 11, 1992

Related U.S. Application Data

[63] Continuation of Ser. No. 687,958, Apr. 19, 1991, abandoned.

[30] Foreign Application Priority Data

Apr. 26, 1990 [NL] Netherlands .................. 9000996

[51] Int. Cl.$^5$ .................................................. A23K 1/00
[52] U.S. Cl. .......................................... 426/2; 426/74; 426/648; 426/807
[58] Field of Search .................. 426/74, 2, 648, 623, 426/807; 71/11

[56] References Cited

U.S. PATENT DOCUMENTS 2,760,866  8/1956  Nielsen ................................. 426/74
3,484,243 12/1969  Anderson ............................. 426/69
3,962,484  6/1976  Grosso et al. ....................... 426/74
4,055,667 10/1977  Linton ................................. 426/74
4,089,979  5/1978  Jackson ............................... 426/74
4,442,215  4/1984  Vognsen ............................ 426/583

OTHER PUBLICATIONS

Hawley, "The Condensed Chemical Dictionary" 10th edition Van Nostrand Reinhold Co Publishers (1962) pp. 179;180;635 & 1110–1111.

*Primary Examiner*—R. B. Penland
*Attorney, Agent, or Firm*—Watson, Cole, Grindle & Watson

[57] ABSTRACT

A method for preparing an aqueous food supplement for cattle wherein water and at least one substrate is used for preparing an aqueous solution of micro- and macro-elements. At least phosphoric acid being added to said water in order to lower the pH of said aqueous food supplement to be obtained to such an extent, that substantially no phosphate precipitation takes place and at least one substantially water insoluble substance is dissolved in said water acidified by phosphoric acid. An additional food supplement comprising a substantially saturated solution of calcium chloride and/or magnesium chloride can be added to the food supplement.

15 Claims, No Drawings

METHOD OF PREPARING AN AQUEOUS FOOD SUPPLEMENT FOR CATTLE AND THUS PREPARED FOOD SUPPLEMENT

This application is a continuation of application Ser. No. 687,958, filed Apr. 19, 1991, now abandoned.

The present invention relates to a method for preparing an aqueous food supplement for cattle wherein water and at least one substance is used for preparing an aqueous solution of micro- and macro-elements comprising at least phosporus.

Such a method is known from the French patent publication No. 2,145,053. According to this known method, a mixture of water soluble solids which can be dosed in the drinking-water of the cattle, is prepared. For the preparation of this water soluble mixture, the macro-element phosphorus is added as ammonium phosphate.

A drawback of this known method consists in that in order to obtain a water soluble mixture, use can only be made of water soluble substances so that the choice of these substances is limited. Due to this limited choice, it is almost unavoidable to use substances which add besides the intended micro or macro-element also an undesired amount of redundant elements such as chlorides to the solution, so that the solubility of the other elements is reduced.

The hereabove mentioned drawback appears for example clearly when comparing example 1 with example 2 from the French patent publication No. 2,145,053. In both examples, the composition of a food supplement for cattle having substantially the same phosphorus and calcium contents is represented. In contrast with example 1 a water soluble mixture is obtained in example 2. To this end, use is made a.o. of calcium chloride and of ammonium phosphate instead of calcium phosphate as a consequence of which the chloride content of the water soluble mixture of example 2 is much higher than the chloride content of the granulate of example 1. Such a high chloride content reduces the solubility of the other elements considerably and limits therefore the content of these elements in the food supplement.

An object of the present invention is to provide a method for preparing an aqueous food supplement wherein besides water soluble substances also substantially water insoluble substances can be used resulting in a larger choice of substances and which method therefore enables to obtain a higher concentration of desired micro-and macro-elements in the food supplement.

To this end, a method according to the invention is characterized in that at least phosphoric acid is added to said water in order to lower the pH of said aqueous food supplement to be obtained to such an extent, that substantially no phosphate precipitation takes place and at least one substantially water insoluble substance is dissolved in said water acidified by said phosphoric acid.

Phosphorus is generally an important macro-element for cattle. In the method according to the invention, this phosphorus is added to the food supplement at least partially as phosphoric acid. This phosphoric acid lowers in the first place the pH of the food supplement in such a manner that the phosphates are present in the form of soluble primary phosphates so that a stable solution, without phosphate precipitation is obtained. The required amount of phosphoric acid depends on the amount of basic reacting substances which are added.

The use of phosphoric acid involves further also the important advantage that a series of water insoluble substances are soluble in water acidified with phosphoric acid. These substances comprise for example oxides and secondary and tertiary phosphates of a.o. magnesium and zinc. These substances react with phosphoric acid to form the water soluble primary phosphates. In this way, no undesired anions are added to the solution. The same goes for carbonates, the carbonate group of which escapes as $CO_2$ gas out of the solution after reaction with phosphoric acid.

The PCT patent application WO 81/02242 teaches to treat fly ash with acid in order to convert the elements present therein into a soluble form. Previously, oxides may be added to the fly ash which are then also converted by the acid into a soluble form. In this patent application, a whole series of possible acids including phosphoric acid is given but the description relates almost only to the use of lactic acid. In all the examples use is made of lactic acid except for example 8 wherein use is made of acetic acid and example 9 wherein the acetic acid is replaced by hydrochloric acid. Nowhere in this patent application the use of phosphoric acid has been discussed further. Consequently, there is nothing in this PCT patent application that suggests the special choice of phosphoric acid. Moreover, WO 81/02242 does not teach to prepare a stable phosphorus containing solution wherein phosphate precipitation is prevented by lowering the pH by using phosphoric acid. On the contrary, when phosphate is added to the food supplement, which is only the case in examples 8 and 9, this phosphate is added as magnesium phosphate and this after neutralizing the mineral containing liquid with for example calcium carbonate. In such a neutral solution, there will occur phosphate precipitation.

In a special embodiment of the method according to the invention, said phosphoric acid is added in such an amount that the pH of said aqueous food supplement equals 3.5 at the most. With such a low pH value, a stable solution is obtained since substantially no secondary and tertiary phosphates are present in this solution.

In a preferred embodiment of the method according to the invention, at least one of the magnesium compounds: magnesium oxide (MgO); primary, secondary and/or tertiary magnesium phosphate ($Mg(H_2PO_4)_2$; $MgHPO_4$; $Mg_3(PO_4)_2$) and magnesium carbonate is dissolved in said acidified water. In the water acidified with phosphoric acid, the magnesium oxide reacts with phosphoric acid to form soluble primary magnesium phosphate. Also the secondary and tertiary magnesium phosphates are converted in the acidified water into soluble primary magnesium phosphates. These magnesium compounds do not add any undesired anions to the solution. The magnesium carbonate reacts in the acidified water to soluble primary magnesium phosphate and $CO_2$ gas which escapes from the solution.

Preferably, some further elements such as zinc and possibly copper (II) are dissolved in the acidified water as oxide, phosphate or carbonate. These compounds also do not add any undesired anions to the solution.

In a further preferred embodiment of the method according to the invention, the pH of said food supplement is adjusted to a predetermined pH value comprised between pH 2.5 and pH 3.5 by adding sodium hydroxide and/or potassium hydroxide if the pH of the food supplement is lower than the said predetermined pH value. Lower pH values have a negative influence on the taste of the drinking water wherein the food supplement will be added and problems will arise at these low pH values when for example vitamines are dissolved in this food supplement since most of the vitamins are not stable in acid. By adding sodium hydroxide and potassium hydroxide, the elements sodium and potassium are also added to the food supplement which has for example for pigs favourable effects. The addition of phosphoric acid allows to use these simple substances which do not add any undesired anions to the solution.

In an effective embodiment of the method according to the invention solids are dissolved in said acidified water in such an amount that a substantially saturated solution is obtained. The method according to the invention allows to prepare such a saturated solution in a simple way, for example without evaporating, and this without bringing a big amount of undesired anions in the solution. Such a solution contains a maximum content of desired food elements and reduces in this way the costs for selling these food supplements.

The invention also relates to a food supplement prepared by applying a method according to the invention, characterized in that it is a substantially saturated solution of micro- and macro-elements, including at least phosphorus, the pH of which is lowered by adding phosphoric acid to such an extent that substantially no phosphate precipitation takes place in the food supplement.

The invention further relates also to an additional food supplement to be used in combination with a food supplement according to the invention, characterized in that it is a substantially saturated solution containing at least calcium chloride and/or magnesium chloride.

Further particularities and advantages of the method and of the food supplement prepared by applying this method according to the invention will become apparent from the following description of some embodiments according to the invention. This description is only given by way of example and does not limit the scope of the invention.

In the modern cattle-breeding, the importance of mineral food elements in the cattle food is clearly recognized. Indeed, it is known that these food elements can have an important influence on all kinds of life and growth processes and it is further known that a shortage of certain elements in the food can have a negative influence on the growth and the productivity of the cattle. In order to prevent this, food supplements consisting of a carrier to which micro- and macro-elements are added are supplied to the cattle in addition to the sometimes rather monotoneous food. Important food elements are for example the macro-elements phosphorus and magnesium and the micro-elements or trace elements zinc, copper, manganese, iodine, selinium and cobalt.

In order to increase the absorption of these food supplements by the cattle, use is made according to the invention of an aqueous solution of nutrient elements which can be dosed in the drinking water of the cattle as a food supplement. Since the nutrient elements are supplied to the cattle in this way in a soluble form, the percentage of absorption of these elements by the digestive system of the cattle in the blood will be higher. Indeed, comparative tests showed that by adding a solution to cattle, the content of these elements in the blood of the cattle was considerably higher than when a same amount of nutrient elements were added as a powder to the food of the cattle. This constatation is true for all types of cattle such as a.o. for poultry, horned cattle, dairy cattle, pigs, sheeps, goats and horses.

As a consequence of this higher absorption percentage, a smaller amount of nutrient elements has to be supplied to the cattle in order to obtain the same nutrient value, which means of cost saving for the cattle-breeder. Moreover, a high absorption percentage results in that only a small portion of the supplied elements are excreted unused in the manure. Consequently, the environmental pollution by the manure is reduced for example due to the lower metal or phosphorus content.

In addition to the higher absorption percentage, the food supplement according to the invention presents the further advantage that it can be dosed easily in the drinking water of cattle. This can be realized for example by means of a computer controlled system which doses the food supplement separately in the drinking water of each animal. An advantage of the food supplement according to the invention is that it can also be dosed globally in the drinking water of all the animals since the drinking water uptake and therefore also the uptake of nutrient elements of each animal is automatically coupled to its growth and/or its productivity. Indeed, fast growing and/or highly productive animals will drink more. For example, a cow giving 20 to 30 liters a day can drink each day up to 150 liters water whereas a dry cow drinks for example 25 to 40 liters water a day. The uptake of nutrient elements by the animal increases therefore proportionally to its water uptake.

Although such an aqueous food supplement has therefore important advantages, there are a number of practical problems involved with disolving nutrient elements. Indeed, when using for each of these nutrient elements only water soluble substances, such as chlorides, the solution will contain too much undesired anions and hence the solubility of the desired nutrient elements will be reduced. A smaller content of nutrient elements reduces however the value of the food supplement and involves increased transport costs.

In the method according to the invention an aqueous solution is prepared comprising at least phosphorus as macro-element. This macro-element phosphorus is added at least partially as phosphoric acid to water so that acidified water is obtained wherein substances, such as oxides, which are little or not water soluble, can be dissolved. For preparing the aqueous food supplement use is made of at least such an amount of phosphoric acid that the pH of the food supplement is sufficiently low to prevent phosphate precipitation. To this end, said phosphoric acid is added preferably in such an amount that the pH of the food supplement equals 3.5 at the most. At such low pH values, there are substantially no secondary or tertiary phosphates which would precipitate for example with magnesium or zink. At pH 3.5, the content of secondary phosphate is about 100 times less than the content of soluble primary phosphates.

In a preferred embodiment, the element phosphorus is added to the water substantially completely as phosphoric acid, for example as a 73 to 75 percent phosphoric acid solution. Preferably, use is made per 100 kg food supplement of 280 to 350 mols and more in particular of 300 to 320 mols phosphoric acid so that a phosphorus rich food supplement is obtained.

In addition to phosphorus, magnesium is also an important macro-element. In the water acidified with phosphoric acid, the magnesium compounds: magnesium oxide (MgO); primary, secondary and/or tertiary magnesium phosphate (Mg(H₂PO₄)₂; MgHPO₄; Mg₃(PO₄)₂) and magnesium carbonate (MgCO₃) can be dissolved. In contrast with for example magnesium chloride and magnesium sulphate, these compounds offer the advantage of bringing no undesired anions in the solution. Also the micro-element zink and possibly even copper can be dissolved in the acidified water as oxide; primary, secondary or tertiary phosphate or as carbonate.

For the elements magnesium and zink, use is preferably made of magnesium oxide and zink oxide. These oxides are single substances which allow to determine the magnesium and zink content completely freely. For disolving these oxides, said water has to be acidified with at least 1.9 mol and preferably with at least 2 mols phosphoric acid per mol of these oxides. Indeed, under these circumstances the following reactions will take place:

$$MgO + 2H_3PO_4 \rightarrow Mg(H_2PO_4)_2 + H_2O$$

$$ZnO + 2H_3PO_4 \rightarrow Zn(H_2PO_4)_2 + H_2O$$

The above mentioned primary magnesium and zink phosphate is well soluble in water so that no precipitation will take place and hence a stable solution is obtained. It will be clear that when use is made of magnesium and zink phosphate less phosphoric acid will be required in order to form the primary phosphates.

When mixing the phosphoric acid with the water and when dissolving the magnesium and zink compounds, heat is generated but the temperature is kept below 40° C. by an appropriate cooling during the mixing.

After having dissolved the little or not water soluble substances, the water soluble substances are dissolved. These are for example copper sulphate (CuSO₄); manganese sulfate (MnSO₄); potassium iodide (KI); sodium selenite (Na₂SeO₃) and cobalt sulphate (CoSO₄). Possibly, the nutrient elements copper and manganese can be dissolved also in the acidified water as oxides. However, when a relatively large amount of magnesium oxide is added, such as for example in the food supplement for horned cattle to prevent grass tetany, the amount of phosphoric acid is not sufficient to dissolve also these oxides.

In the method according to the invention, solids are dissolved preferably in such an amount that a substantially saturated solution is obtained. Possibly, a number of these solids can be dissolved first before being added to the food supplement as a solution. Preferably, use is made of pure substances which are suited for use in animal food and which add as less as possible undesired substances to the solution.

For preparing the food supplement, use can further be made of water soluble bases, such as potassium hydroxide and sodium hydroxide. With these bases, the pH of the food supplement is preferably adjusted to a predetermined pH value comprised between pH 2.5 and pH 3.5. The use of these bases is especially appropriate when little magnesium oxide is added, such as for example in a food supplement for pigs, so that a big amount of phosphoric acid remains, which amount can then react with these bases. Moreover, it has been determined that also sodium and potassium are useful nutrient elements for pigs.

Possibly, the food supplement can also be completed with vitamins, such as vitamins from the B group which are acid-resistant at pH values higher than 2.5. Also vitamin E preferably in combination with selenium and possibly with a sulphur containing compound such as glutathion has favourable effects and this especially on the fertility of cows.

Using phosphoric acid when composing the food supplement is not only advantageous for the solubility of the added oxides but has also a positive influence on the taste and the pH of the drinking water to which this food supplement is added. Indeed, there has been determined that the free phosphoric acid which has not been neutralized has a positive influence on the taste of the drinking water provided that the pH of the food supplement is not lower than pH 2.5. Further, lowering the pH of the drinking water up to a pH 3.5–4 has a positive influence on the digestion of the food in the stomach of cows a.o. Consequently, the manure will contain less undigested proteins and hence the ammonia volatilisation from this manure will be reduced.

By means of the hereabove described method according to the invention, different food supplements can be composed for example based on food standards elaborated by research centra for different animals. The pH of the food supplement is lowered each time by adding phosphoric acid to such an extent that substantially no precipitation of phosphates takes place.

An aqueous food supplement which is according to the invention especially suitable for being dosed in the drinking water of horned cattle contains per 100 kg, 9 to 11 kg phosphorus, 2 to 5 kg magnesium; 0.25 to 0.45 kg zinc; 0.20 to 0.40 kg copper; 0.30 to 0.40 kg manganese; 6 to 10 gr iodine; 0.5 to 2 g selenium and 7 to 8 g cobalt.

A preferred embodiment of such a food supplement according to the invention for horned cattle is shown in Table I.

TABLE I

Composition of a food supplement according to the invention for horned cattle per 100 kg of this food supplement.

| Mineral substance | Kg mineral substance | Number of moles | Amount of nutrient element |
|---|---|---|---|
| H₃PO₄(73–75%) | 40.4 | 305 | 9.5 kg P |
| MgO | 6.0 | 150 | 3.6 kg Mg |
| ZnO | 0.4 | 5 | 0.32 kg Zn |
| CuSO₄ | 1.47 | 9 | 0.37 kg Cu |
| MnSO₄ | 1.08 | 7 | 0.35 kg Mn |
| KI | 0.0104 | 0,06 | 8 g I |
| Na₂SeO₃ | 0.0059 | 0,034 | 1.77 g Se |
| CoSO₄ | 0.0036 | 0,023 | 0.75 g Co |
| H₂O | 50.65 | | |

This food supplement contains an amount of nutrient elements which enhances the growth, the productivity and/or the health of the cattle. Experimentally it has indeed been determined that by using the food supplement of Table 1, instead of supplying the therein contained minerals as a powder mixed in the animal food, the general health condition of the cows was clearly improved which was indicated a.o. by a brighter skin of the animals.

The next experiment shows the increased mineral obtained in the blood of the animal by supplying the liquid food supplement from Table 1, the selenium content being considered in particular.

EXPERIMENT

This experiment has been carried out with 10 cows which have been given minerals before this experiment solely as solids in the food. In this way, an average of about 1.5 mg selenium has been supplied to each animal a day. The selenium content in the blood of these cows was determined by measuring at 25° C. the conversion rate of a certain enzyme, the enzymatic reaction of which is influenced by the selenium content. Then, during 4 successive months, the liquid food supplement from Table 1 was added to the drinking water of these cows. Each animal received on average about 50 ml food supplement a day or, taking into account the percentage selenium present in the food supplement, about 0.885 mg selenium a day. After these 4 months, the selenium content in the blood was measured with the same measuring method. The results of both measurements are represented in Table 2.

TABLE 2

Selenium content in the blood of cows before and after 4 months of supplying the food supplement of Table 1 to the drinking water.

| Cow | Initial Selenium Content | Selenium content after 4 months |
| --- | --- | --- |
| 1 | 46 | 277 |
| 2 | 107 | 299 |
| 3 | 151 | 312 |
| 4 | 40 | 292 |
| 5 | 67 | 469 |
| 6 | 22 | 404 |
| 7 | 177 | 411 |
| 8 | 20 | 310 |
| 9 | 120 | 309 |
| 10 | 147 | 316 |

Table 2 shows clearly that the selenium content in the blood of the cows is increased although they received less selenium (0.885 mg/day against 1.5 mg/day). This indicates clearly that selenium is absorbed considerably better in the blood when it is supplied as a liquid through the drinking water.

At the end of this 4 months period it has been observed that the cows were more in heat and that embryo's which had been implanted in a number of these cows had more chances to grow than embryo's implanted in cows which had not received the liquid food supplement. These effects can further be improved by adding vitamin E, possibly in combination with glutathion, to the food supplement.

In addition to the aqueous food supplement for horned cattle, the invention provides also an aqueous food supplement which is especially suitable to be dosed in the drinking water of pigs. Such a food supplement contains preferably per 100 kg, 8 to 11 kg phosphorus; 0.3 to 2 kg magnesium; 0.25 to 0.45 kg zinc; 0.20 to 0.40 kg copper; 0.05 to 0.20 kg manganese; 1 to 5 g iodine and 0.5 to 2 g selenium. Compared to the food supplement for horned cattle, this food supplement contains little magnesium since pigs are not susceptible to grass tetany when the potassium/magnesium ratio is too high. To the food supplement for pigs, sodium hydroxide and/or potassium hydroxide is further added until the pH is comprised between pH 2.5 and pH 3.5. Sodium as well as potassium are also essential nutrient elements for pigs.

The following Table 3 gives an example of an aqueous food element which meets the food requirements of pigs and which contains moreover a high concentration of readily absorbable nutrient elements.

TABLE 3

Composition of a food supplement according to the invention for pigs per 100 kg of this food supplement.

| Mineral substance | Kg mineral substance | Number of moles | Amount of nutrient element |
| --- | --- | --- | --- |
| $H_3PO_4$(75%) | 41.0 | 313 | 9.7 kg P |
| MgO | 0.71 | 17.8 | 0.43 kg Mg |
| ZnO | 0.43 | 5.3 | 0.35 kg Zn |
| NaOH (33%) | 1.77 | 14.6 | 0.336 kg Na |
| KOH (50%) | 7.4 | 66 | 2.58 kg K |
| NaCl | 2.52 | 95 | 1 kg Na; 1.52 kg Cl |
| $CuSO_4.5H_2O$ | 0.11 | 0.44 | 28 g Cu |
| $MnSO_4.H_2O$ | 0.34 | 2.0 | 0.11 kg Mn |
| KI | 0.0045 | 0.027 | 3.4 g I |
| $Na_2SeO_3$ | 0.0024 | 0.014 | 1.1 g Se |
| Water | 45.7 | — | — |

In addition to the hereabove described specific food supplements for horned cattle and pigs, specific food supplements can also be composed for other animals such as chickens, sheep and horses on the basis of their food requirements. For chicken, the nutrient element calcium is also added to the food supplement for example as calcium oxide or as calcium phosphate and molybdene which is especially advantageous for poussins, is preferably also added. For dissolving the hereabove mentioned calcium oxide and calcium phosphate, use is also made of the phosphoric acid. Further, many other substances such as vitamins and for example carotenoids can be added.

When using the hereabove described food supplement according to the invention, the problem remains that the mineral food requirements of the animals is not only dependent on the animal species but also a.o. on the composition of the roughage and further also on all kinds of other factors, such as the general health condition of the animals. In order to allow a flexible adaptation of the food supplement, the invention provides also an additional food supplement which is to be used in combination with a basic food supplement according to the invention and which is a substantially saturated solution containing at least calcium chloride and/or magnesium chloride.

In a preferred embodiment, such an additional food supplement is composed per 100 kg of 82 kg of a 28% magnesium chloride solution, 12 kg of a 31% calcium chloride solution, 6 kg solid calcium chloride ($CaCl_2.2H_2O$) and 4.4 g sodium selenite. These substances are all of pharmaceutical grade. In the obtained concentrated solution, the magnesium content equals about twice the calcium content. This additional food supplement is especially suited for horned cattle and especially for horned cattle fed with roughage harvested on poor sandy soils. It has been observed that by using this additional food supplement in combination with the food supplement from Table 1, the cows are not only prevented against grass tetany but also against milk illness which accompanies usually grass tetany. Moreoever, the fertility of these cows is enhanced additionally by the selenium present in the additional food supplement. Each day, a total amount of maximum 100 ml of the food supplement together with the additional food supplement are dosed per animal in the drinking water.

It will be clear that the hereabove described embodiments can be modifier in many ways without leaving the scope of the present invention.

The liquid food supplement according to the invention could for example possibly be spraid over the roughage of the cattle so that in this way the cattle takes up the supplementary minerals in a dissolved form. However, the food supplement is preferably added to the drinking water or possibly to liquid food such as milk.

What is claimed is:

1. In a method for preparing an aqueous food supplement for cattle comprising dissolved macro and micro elements, including phosphorus, magnesium, zinc, copper and manganese, in such predetermined mutual ratios that a predetermined supplemental feeding of the cattle is obtained when supplying the food supplement to the cattle, the improvement which comprises mixing water and substances which include first substances selected from the group consisting of oxides, hydroxides, phosphates and carbonates, and dissolving said substances in said water in combination with a predetermined amount of phosphoric acid to obtain a substantially saturated solution containing said macro and micro elements, which solution is capable of being dosed in drinking water of the cattle, in which method 280 to 350 moles of phosphates are incorporated per 100 kg food supplement and said first substances are used in such a predetermined amount that said saturated solution has a pH lower than pH3.5 to avoid phosphate precipitation.

2. A method as claimed in claim 1, wherein said first substances include at least one magnesium compound selected from the group consisting of magnesium oxide; primary, secondary and/or tertiary magnesium phosphate; and magnesium carbonate.

3. A method as claimed in claim 1, wherein said first substances include at least one zinc compound selected from the group consisting of zinc oxide, primary, secondary and/or tertiary zinc phosphate; and zinc carbonate.

4. A method as claimed in claim 1, wherein magnesium oxide and zinc oxide are used for preparing said aqueous solution and acidified water containing at least 1.9 moles of phosphoric acid per mol oxide is used for dissolving these oxides.

5. A method as claimed in claim 1, wherein use is made of 300 to 320 moles phosphoric acid per 100 kg food supplement.

6. A method as claimed in claim 1, wherein the pH of said food supplement is adjusted to a predetermined pH-value between pH 2.5 and pH 3.5 by adding sodium hydroxide and/or potassium hydroxide if the pH of the food supplement is lower than said predetermined pH-value.

7. A method as claimed in claim 1, wherein said food supplement is prepared from water and substantially pure substances.

8. A method as claimed in claim 1, wherein at least one organic, water-soluble growth stimulating agent, is dissolved in said food supplement.

9. A method as claimed in claim 1, wherein said substantially saturated solution is suitable for being dosed in drinking water of horned cattle and contains, per 100 kg, 9 to 11 kg phosphorus; 2 to 5 kg magnesium, 0.25 to 0.45 kg zinc; 0.20 to 0.40 kg copper; 0.30 to 0.40 kg manganese; 6 to 10 g iodine; 0.5 to 2 g selenium and 7 to 8 g cobalt.

10. A method as claimed in claim 1, wherein said substantially saturated solution is suitable for being dosed in drinking water of pigs and contains, per 100 kg; 8 to 11 kg phosphorus; 0.3 to 2 kg magnesium; 0.25 to 0.45 kg zinc; 0.20 to 0.40 kg copper; 0.05 to 0.2 kg manganese; 1 to 5 g iodine; and 0.5 to 2 g selenium and the pH of which is adjusted to a predetermined pH-valve comprised between pH 2.5 and pH 3.5 by adding sodium hydroxide and/or potassium hydroxide.

11. A method as claimed in claim 1 wherein said preparation of said aqueous food supplement for cattle further comprises a preparation of an additional food supplement consisting of a further substantially saturated solution containing at least calcium chloride and/or magnesium chloride.

12. A method as claimed in claim 10, wherein said additional food supplement has a calcium content and a magnesium content which is substantially twice the calcium content.

13. A method as claimed in claim 12, wherein said additional food supplement further contains selenium.

14. A method as claimed in claim 11, wherein, after preparation of said food supplement and said additional food supplement, both are dosed in the drinking water of said cattle.

15. A method as claimed in claim 1 wherein after preparation of said food supplement, the latter is dosed in the drinking water of said cattle.

* * * * *